(12) United States Patent
Choupak et al.

(10) Patent No.: US 8,767,940 B2
(45) Date of Patent: *Jul. 1, 2014

(54) SYSTEM, METHOD AND APPARATUS FOR PLACING A TELEPHONE CALL

(71) Applicant: Stanacard LLC, New York, NY (US)

(72) Inventors: Michael David Choupak, Cupertino, CA (US); Eduard Romanov, New York, NY (US)

(73) Assignee: Stanacard LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,832

(22) Filed: Apr. 16, 2013

(65) Prior Publication Data

US 2013/0235988 A1 Sep. 12, 2013

Related U.S. Application Data

(63) Continuation of application No. 12/049,917, filed on Mar. 17, 2008, now Pat. No. 8,422,655, which is a continuation of application No. 11/045,460, filed on Jan. 27, 2005, now Pat. No. 7,346,156.

(60) Provisional application No. 60/540,302, filed on Jan. 29, 2004.

(51) Int. Cl.
*H04M 3/42* (2006.01)

(52) U.S. Cl.
USPC .................. 379/216.01; 379/201.02

(58) Field of Classification Search
USPC ............ 379/216.01, 114.15, 114.16, 114.17, 379/114.2, 115.02, 114.01, 114.18, 201.02
See application file for complete search history.

(56) References Cited

U.S. PATENT DOCUMENTS

| | | | |
|---|---|---|---|
| 5,163,087 A | 11/1992 | Kaplan | 379/221.01 |
| 5,878,126 A | 3/1999 | Velamuri et al. | 379/219 |
| 5,884,972 A | 3/1999 | Deptolla | 297/378.11 |
| 6,038,291 A | 3/2000 | Cannon et al. | 379/74 |
| 6,041,114 A | 3/2000 | Chestnut | 379/211.02 |
| 6,160,877 A | 12/2000 | Tatchell et al. | 379/197 |
| 6,175,622 B1 | 1/2001 | Chiniwala et al. | 379/211 |
| 6,188,683 B1 | 2/2001 | Lang et al. | 370/352 |
| 6,246,757 B1 | 6/2001 | Cai et al. | 379/144 |
| 6,690,779 B2 | 2/2004 | Walker et al. | 379/144.01 |
| 6,813,504 B2 | 11/2004 | Benchetrit et al. | 455/461 |
| 6,873,690 B2 | 3/2005 | Moon et al. | 379/114.2 |
| 6,920,487 B2 | 7/2005 | Sofer et al. | 709/218 |

(Continued)

FOREIGN PATENT DOCUMENTS

| | | |
|---|---|---|
| EP | 1 267 556 A2 | 12/2002 |
| WO | WO 95/06381 A1 | 3/1995 |
| WO | WO 03/028355 A1 | 4/2003 |

OTHER PUBLICATIONS

Jajah's Invalidity Contentions, *Jajah Inc.* v. *Stanacard LLC*, No. C 09-00580JW.

(Continued)

*Primary Examiner* — Olisa Anwah
(74) *Attorney, Agent, or Firm* — Winston & Strawn LLP

(57) ABSTRACT

In one embodiment, the methods and apparatuses detect an identity of a caller; receive an assigned incoming telephone number; identify a recipient associated with the assigned incoming telephone number and the identity; and connect the caller and the recipient.

10 Claims, 6 Drawing Sheets

(56) References Cited

U.S. PATENT DOCUMENTS

| | | | |
|---|---|---|---|
| 6,970,541 B2 | 11/2005 | Bates et al. | 379/114.15 |
| 6,999,575 B1 | 2/2006 | Sheinbein | 379/220.01 |
| 7,103,163 B1 | 9/2006 | Cook | 379/142.06 |
| 7,103,168 B2 * | 9/2006 | Bedingfield et al. | 379/216.01 |
| 7,218,721 B1 | 5/2007 | Vincent et al. | 379/220.01 |
| 7,346,156 B1 | 3/2008 | Choupak et al. | 379/216.01 |
| 8,422,655 B2 | 4/2013 | Choupak et al. | 379/216.01 |
| 2002/0164978 A1 | 11/2002 | Moskowitz et al. | 455/415 |
| 2003/0119492 A1 | 6/2003 | Timmins et al. | 455/414 |
| 2005/0002508 A1 | 1/2005 | Elsey et al. | 379/201.01 |
| 2008/0260139 A1 | 10/2008 | Ruckart et al. | 379/221.01 |
| 2012/0134486 A1 | 5/2012 | Caipa et al. | 379/221.02 |

OTHER PUBLICATIONS

First Claim Construction Order, *Jajah Inc.* v. *Stanacard LLC*, No. C 09-00580JW.

Opinion, *Stanacard, LLC* v. *Rebtel Networks, AB*, and *Rebtel Mobile, Inc.*, 08cv4859.

Consent Order of Dismissal and Permanent Injunction, *Stanacard* v. *Jaxtr, et al.*, 1:09cv01340PKC.

A letter from the attorney for Defendant Global Telelinks to Plaintiff's attorney, *Stanacard* v. *Jaxtr, et al.*, 1:09cv01340PKC.

* cited by examiner

SYSTEM, METHOD AND APPARATUS FOR PLACING A TELEPHONE CALL

FIELD OF THE INVENTION

The present invention relates generally to placing a telephone call and, more particularly, to placing a telephone call that is forwarded to another location.

BACKGROUND

Calling cards have been utilized by calling card caller to complete their telephone calls. There are many benefits for using a calling card. By using a calling card, the caller is able to negotiate a favorable per minute rate to complete these telephone calls. Further, besides the amount of minutes pre-purchased through a calling card plan, there is typically no long term obligation to continue with a calling card plan. In addition, a calling card caller is typically able to utilize any telephone within a general geographic area to complete the telephone call without incurring any toll charges to the originating telephone.

However, utilizing a calling card is often times more difficult than directly dialing the recipient's telephone number. For example, some calling card plans require the calling party to initially dial a general toll free number to the calling card center. After calling the calling card center, the calling party enters the calling party's identification code, and then finally dials the recipient's telephone number. Further, if the calling card is lost or stolen, a person possessing the calling card is typically capable of using this calling card to complete his/her own telephone calls.

SUMMARY

In one embodiment, the methods and apparatuses detect an identity of a caller; receive an assigned incoming telephone number; identify a recipient associated with the assigned incoming telephone number and the identity; and connect the caller and the recipient.

BRIEF DESCRIPTION OF THE DRAWINGS

The accompanying drawings, which are incorporated in and constitute a part of this specification, illustrate and explain one embodiment of the methods and apparatuses for placing a telephone call. In the drawings.

DETAILED DESCRIPTION

The following detailed description of the methods and apparatuses for placing a telephone call refers to the accompanying drawings. The detailed description is not intended to limit the methods and apparatuses for placing a telephone call. Instead, the scope of the methods and apparatuses for placing a telephone call is defined by the appended claims and equivalents. Those skilled in the art will recognize that many other implementations are possible, consistent with the present invention.

Figure 1:
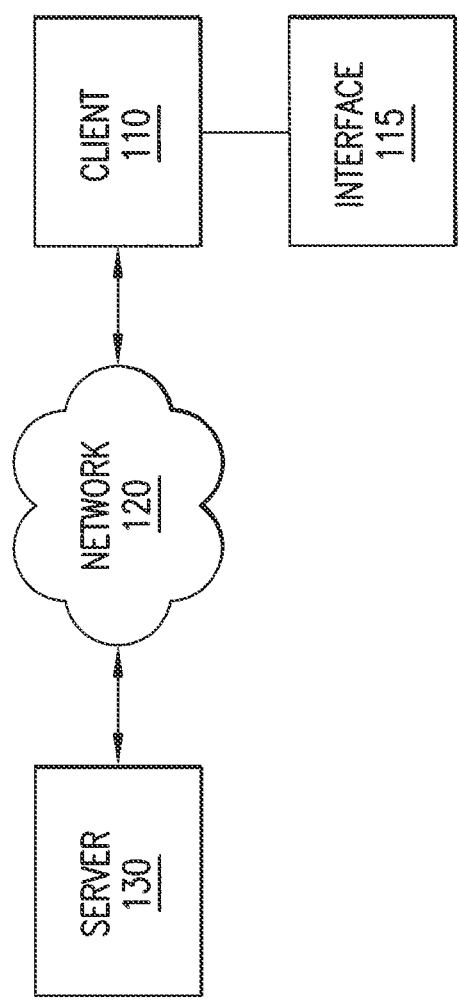
FIG. 1 is a diagram illustrating an environment within which the methods and apparatuses placing a telephone call are implemented.

FIG. 1 is a diagram illustrating an environment within which the methods and apparatuses for placing a telephone call are implemented. The environment includes an electronic device 110 (e.g., a land line telephone, a cellular telephone, a satellite telephone, and the like), a caller interface 115, a network 120 (e.g., a local area network, a home network, the Internet, telephone network), and a server 130 (e.g., a computing platform configured to act as a server).

In one embodiment, one or more caller interface 115 components are made integral with the electronic device 110 (e.g., keypad, video display screen, telephone, and speaker). In other embodiments, one or more caller interface 115 components such as a keyboard, a pointing device (e.g., mouse and trackball) a display, and a camera are physically separate from, and are conventionally coupled to, electronic device 110. In one embodiment, the caller utilizes interface 115 to access and control content and applications stored in electronic device 100, server 130, or a remote storage device (not shown) coupled via network 120.

In accordance with the invention, embodiments of placing a telephone call below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

The methods and apparatuses for placing a telephone call are shown in the context of exemplary embodiments of applications in which a caller dials an assigned incoming telephone number to reach a recipient that is associated with this assigned incoming telephone number.

In one embodiment, the methods and apparatuses for placing a telephone utilize a record associated with a caller to track caller information such as the caller's selected telephone numbers, recipients associated with assigned incoming telephone numbers, and funds.

Figure 2:
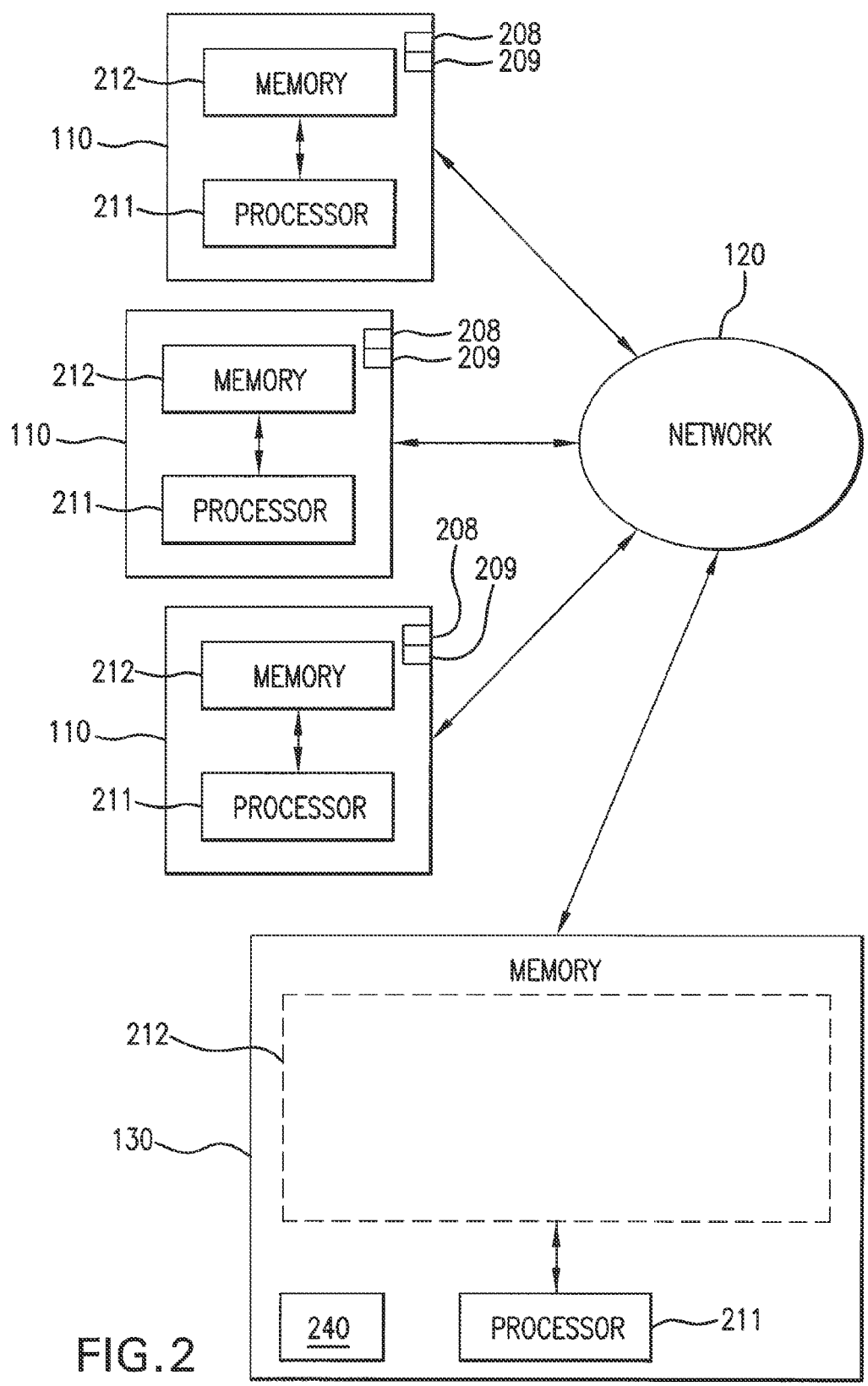
FIG. 2 is a simplified block diagram illustrating one embodiment in which the methods and apparatuses for placing a telephone call are implemented.

FIG. 2 is a simplified diagram illustrating an exemplary architecture in which the methods and apparatuses for placing a telephone call are implemented. The exemplary architecture includes a plurality of devices 110, a server device 130, and a network 120 connecting devices 110 to server 130 and each device 110 to each other.

The plurality of devices 110 are each configured to include a speaker 208 and a microphone 209. In one embodiment, each of the plurality of devices 110 is associated with a unique telephone number. In another embodiment, multiple devices 110 share the same telephone number. In one embodiment, a unique caller operates each electronic device 110 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processor 211 is manufactured by Intel Corporation, of Santa Clara, Calif. In other instances, other microprocessors are used.

In one embodiment, the plurality of devices 110 and the server 130 include instructions for a customized application for placing a telephone call. In one embodiment, the computer-readable media 212 contains, in part, the customized application. Additionally, the plurality of devices 110 and the server 130 are configured to receive and transmit electronic signals for use with the customized application. Similarly, the network 120 is configured to transmit electronic messages for use with the customized application and is configured to transmit voice signals between multiple devices 110.

Figure 3:
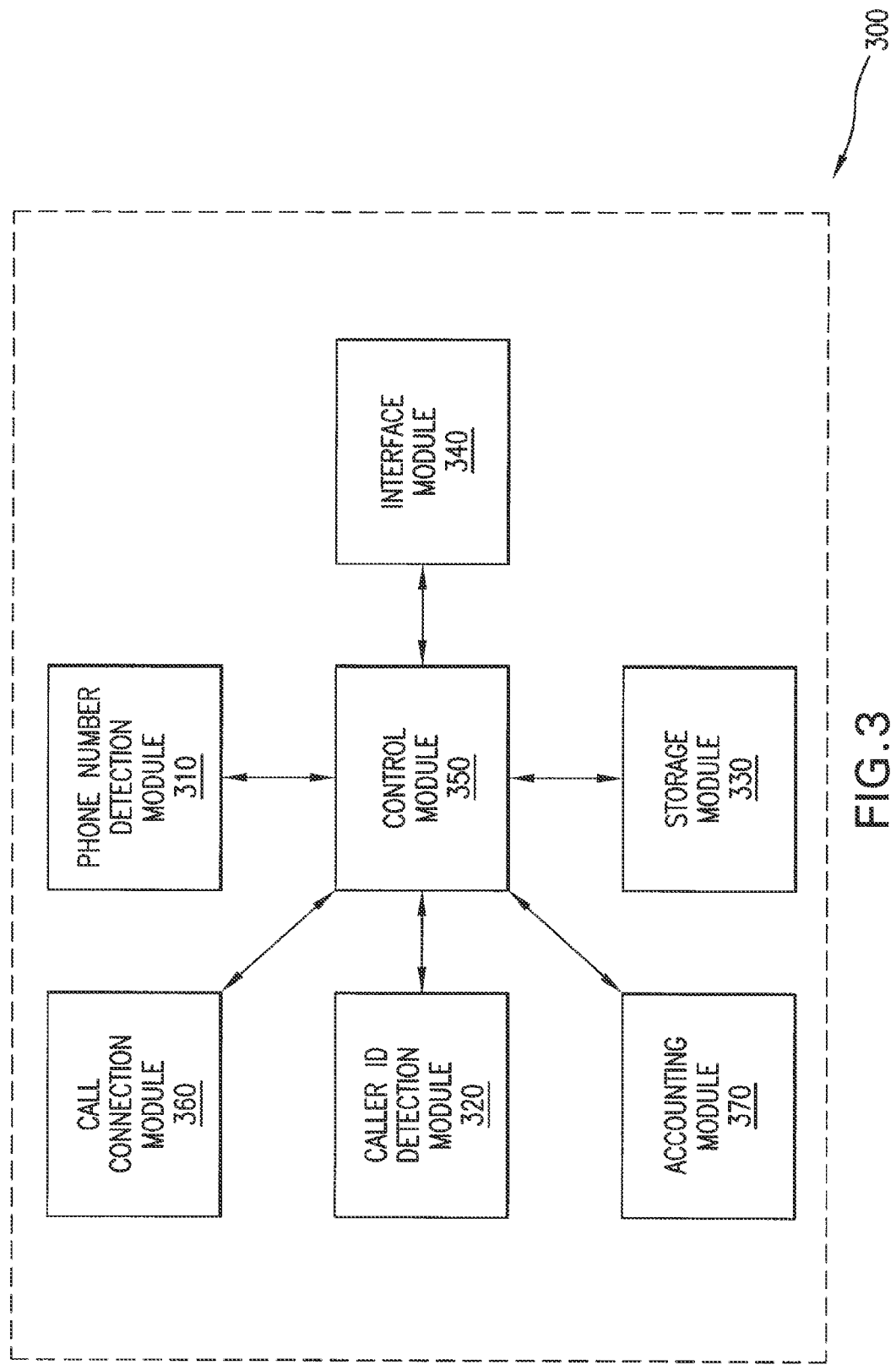
FIG. 3 is a simplified block diagram illustrating a system, consistent with one embodiment of the methods and apparatuses placing a telephone call.

FIG. 3 illustrates one embodiment of a system 300. In one embodiment, the system 300 is embodied within the server 130. In another embodiment, the system 300 is embodied within the device 110. In yet another embodiment, the system 300 is embodied within both the device 110 and the server 130.

In one embodiment, the system 300 includes a telephone number detection module 310, a caller identification detection module 320, a storage module 330, an interface module 340, a control module 350, a call connection module 360, and an accounting module 370.

In one embodiment, the control module 350 communicates with the telephone number detection module 310, the caller identification detection module 320, the storage module 330, the interface module 340, the call connection module 360, and the accounting module 370. In one embodiment, the control module 350 coordinates tasks, requests, and communications between the telephone number detection module 310, the caller identification detection module 320, the storage module 330, the interface module 340, the call connection module 360, and the accounting module 370.

In one embodiment, the telephone number detection module 310 detects the telephone number dialed by the caller. In one embodiment, the telephone number dialed by the caller is an assigned incoming telephone number that corresponds with a recipient. In one embodiment, the particular recipient associated with the assigned incoming telephone number is predetermined by the caller. By uniquely identifying the assigned incoming telephone number dialed by the caller, the system 300 is able to determine, in part, which recipient should receive the telephone call initiated by the caller.

In one embodiment, the caller identification detection module 320 determines the originating telephone number that the caller is utilizing when making the telephone call. In one embodiment, the caller's telephone number is detected by the caller identification module 320 through a caller ID service. In this embodiment, the caller identification module 320 automatically senses the caller's telephone number through the caller ID service. In another embodiment, the caller's originating telephone number is manually entered by the caller.

In both embodiments, the caller identification module 320 detects the caller's telephone number. In one embodiment, the caller's telephone number identifies the identity of the caller. For example, the caller assigns one or more telephone numbers such that when these assigned telephone numbers are detected by the caller identification module 320, the caller's identity is identified upon placing the telephone call from one of the telephone numbers assigned by the caller.

Figure 4:
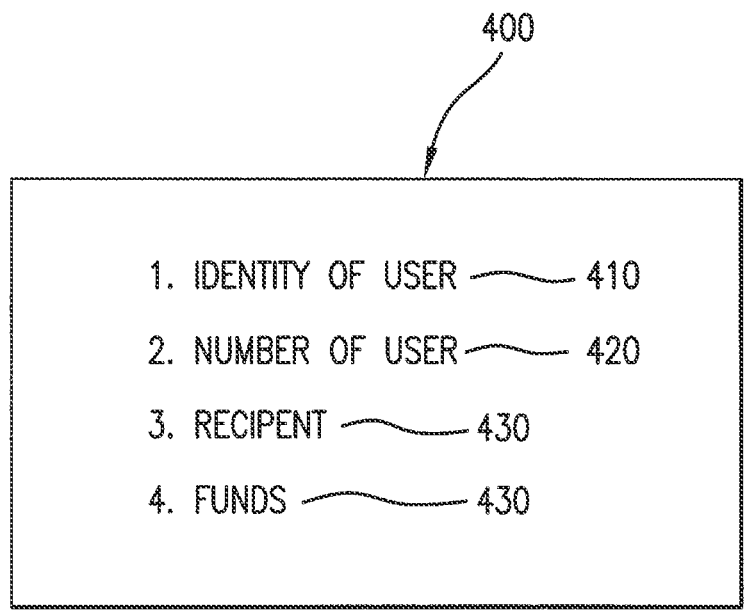
FIG. 4 is an exemplary record for use with the methods and apparatuses for placing a telephone call.

In one embodiment, the storage module 330 stores a record including information associated with a particular caller. Each record illustrates a profile for the particular caller. An exemplary embodiment of the information contained within the record associated with a caller is illustrated in FIG. 4.

In one embodiment, the interface module 340 receives a signal from one of the devices 110 indicating the assigned incoming telephone number that is dialed by the caller. In another embodiment, the interface module 340 indicating the telephone number that is being utilized by the caller to initiate the telephone call.

In one embodiment, the call connection module 360 connects the caller with a recipient. In one embodiment, the call connection module 360 selects a particular recipient based on the profile information associated with the caller. For example, the caller programs the system 300 to connect with a particular recipient when the caller dials one of the assigned incoming telephone numbers.

In one embodiment, the call connection module 360 dials the particular recipient's telephone number and connects the caller with the particular recipient. In this example, the assigned incoming telephone number dialed by the caller is associated with the recipient within the system 300. The assigned incoming telephone number is configured to reach the recipient at the recipient's telephone number when the particular caller dials the assigned incoming telephone number.

In one embodiment, the call connection module 360 connects the caller with a particular recipient based on the identity of the caller, the caller's profile, and the assigned incoming telephone number dialed by the caller. For example, Caller #1 dials a telephone number 555-4212. The call connection module 360 connects Caller #1 with Recipient #1, based on the identity of Caller #1, Caller #1's profile, and the assigned incoming telephone number dialed by Caller #1. In this example, Caller #2 dials the same telephone number (555-1212). The call connection module 360 connects Caller #2 with Recipient #2, based on the identity of Caller #2, Caller #2's profile, and the assigned incoming telephone number dialed by Caller #2. In one embodiment, the same assigned incoming telephone number is associated with multiple recipients. However, the recipients associated with this same assigned incoming telephone number are unique based on the identity of the caller. In this embodiment, the particular recipient is selected based on the callers identity and the caller's profile.

In one embodiment, the accounting module 370 tracks the length of time that the caller stays connected to various recipients. By tracking the length of time, the system 300 is capable of subtracting the correct amount of money from the prepaid amount purchased by the caller and prevents the caller from exceeding the prepaid amount.

In another embodiment, the accounting module 370 tracks the length of time the caller stays connected to various recipients and bills the caller for the amount of time utilized by the caller.

In yet another embodiment, the accounting module 370 tracks the location of the various recipients and charges the caller based on the geographical location of the recipient. For example, if the recipient is located in a foreign country, then the caller is billed at a higher rate per minute. On the other hand, if the recipient is located domestically, then the caller is billed at a lower rate per minute.

The system 300 in FIG. 3 is shown for exemplary purposes and is merely one embodiment of the methods and apparatuses for placing a telephone call. Additional modules may be added to the system 300 without departing from the scope of the methods and apparatuses for placing a telephone call. Similarly, modules may be combined or deleted without departing from the scope of the methods and apparatuses for placing a telephone call.

FIG. 4 illustrates an exemplary record 400 identifying attributes or profile information of a particular caller for use with the system 300. In one embodiment, there are multiple records such that each record 400 is associated with a particular caller. In one embodiment, the record 400 includes an identity of funds field 440.

In one embodiment, the identity of the caller field 410 uniquely identifies the caller. In one example, the caller is identified by the caller's name. In another example, the caller is identified by a log-in identification.

In one embodiment, the number of the caller field 420 identifies a telephone number specified by the caller that allows the caller to originate calls utilizing the system 300. In one embodiment, the caller specifies multiple numbers. By specifying multiple numbers, the caller is recognized by the system 300 when originating a call from any of these specified numbers. In one embodiment, when a call is originated from any of the numbers specified within the number of the caller field 420, the system 300 recognizes the particular caller's identity associated with the record 400.

In one embodiment, the recipient field 430 identifies a particular assigned incoming telephone number that is associated with a particular recipient. Further, each recipient is associated with a unique assigned incoming telephone number. For example, if a particular recipient is associated with a particular assigned incoming telephone number, the particular recipient is connected to the caller when the caller dials the particular assigned incoming telephone number from a telephone number that is specified in the number of the caller field 430.

In one embodiment, the recipient field 430 also identifies the recipient's true telephone number that allows the system 300 to connect the caller with the recipient. The recipient's true telephone number is dialed to reach the recipient. However, while utilizing the methods and apparatuses for placing a telephone call, the caller dials the particular incoming telephone number to be connected to the recipient.

In one embodiment, the funds field 440 identifies the funds that the caller has available. In one embodiment, the caller prepays an amount such that each time a call is made, an amount is deducted based on details of the call. In this embodiment, the funds field 440 represents a current balance of the prepaid amount.

In another embodiment, the caller pays a monthly bill based on the volume of calls made. In this embodiment, the funds field 440 represents a current balance for the caller.

As shown in FIG. 4, the caller is a user of the system with an associated record 400. In one embodiment, this record 400 makes it possible for a user to dial an assigned incoming call (call identifier) from an originating device with a corresponding originating device number (origination device identifier) stored in caller field 420 and get connected to a recipient communication device with a corresponding communication device number (recipient device identifier) stored in recipient field 430, without requiring the user to enter any access code or secondary telephone number.

Figure 5:
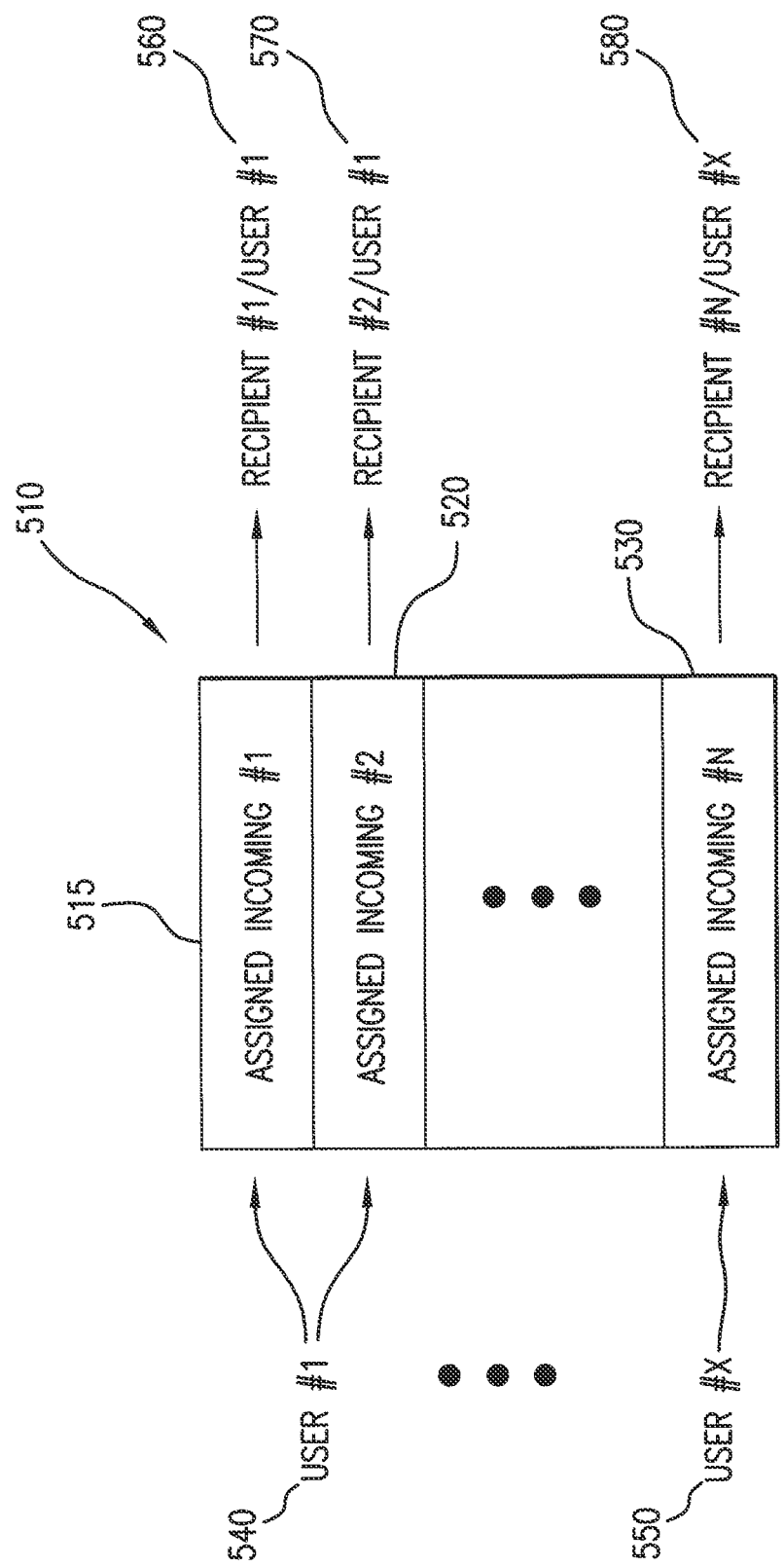
FIG. 5 is a simplified block diagram illustrating a system, consistent with one embodiment of the methods and apparatuses placing a telephone call.

FIG. 5 illustrates an exemplary block diagram of the relationship between the callers, assigned incoming numbers, and recipients. The elements within FIG. 5 are shown for illustrative purposes only and are not intended to limit the invention. A group of assigned incoming numbers 510 includes an assigned incoming #1 515, an assigned incoming #2 520, and an assigned incoming #N 530. In one embodiment, N is represented by various integers. In one embodiment, each of these assigned incoming numbers is represented by a unique, conventional telephone number.

A caller #1 540 and a caller #X 550 are shown to represent individual callers. In one embodiment, X is represented by various integers.

A recipient #1/caller #1 560, a recipient #2/caller #1 570, and a recipient #N/caller #X 580 represent different recipients.

The recipient #1/caller #1 560 is associated with the caller #1 540 through the assigned incoming #1 515. Accordingly, if caller #1 540 dials the assigned incoming #1 515, then a recipient #1/caller #1 560 is contacted. Similarly, the recipient #2/caller #1 570 is associated with the caller #1 540 through the assigned incoming #2 520. Accordingly, if caller #1 540 dials the assigned incoming #2 520, then a recipient #2/caller #1 570 is contacted. In another example, if caller #X 550 dials the assigned incoming #2 520, then a recipient #2/caller #X (not shown) is contacted.

The recipient #N/caller #X 580 is associated with the caller #X 550 through the assigned incoming #N 530. Accordingly, if caller #X 550 dials the assigned incoming #N 530, then a recipient #N/caller #X 580 is contacted.

Figure 6:
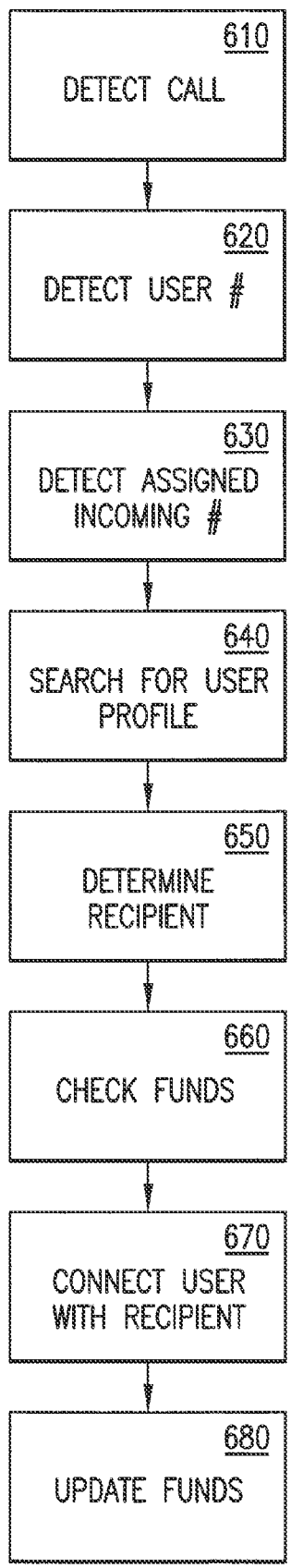
FIG. 6 is a flow diagram consistent with one embodiment of the methods and apparatuses for placing a telephone call.

The flow diagram as depicted in FIG. 6 is one embodiment of the methods and apparatuses for placing telephone calls. The blocks within the flow diagram can be performed in a different sequence without departing from the spirit of the methods and apparatuses for placing telephone calls. Further, blocks can be deleted, added, or combined without departing from the spirit of the methods and apparatuses for placing telephone calls.

The flow diagram in FIG. 6 illustrates selecting a meeting location based on multiple factors according to one embodiment of the invention.

In Block 610, a telephone call is detected.

In Block 620, the caller's telephone number is detected. In one embodiment, the caller identification module 320 detects the caller's telephone number. In one embodiment, the caller's telephone number is automatically number from which the telephone call is placed. In another embodiment, the caller enters a telephone number that identifies the caller.

In Block 630, the assigned incoming telephone number is detected. In one embodiment, the telephone number detection module 310 detects the assigned incoming telephone number.

In Block 640, a caller profile is searched. In one embodiment, a database containing multiple caller profiles is searched. In one embodiment, the database is illustrated in the storage module 330. In one embodiment, an exemplary caller profile is illustrated in the record 400.

In one embodiment, the correct caller profile that corresponds with the caller is found by matching the caller's telephone number as detected in the Block 620 with the number of the caller field 420. In another embodiment, the caller enters a password or personal identification number that identifies the caller.

In Block 650, the recipient is determined. In one embodiment, the recipient is determined, in part, based on the assigned incoming telephone number dialed by the caller. In another embodiment, the recipient is determined, in part, by the recipient selected by the caller to be associated with the specific assigned incoming telephone number as shown in the recipient field 430 within the caller's profile. For example, the recipient of the telephone call initiated by the caller depends on the assigned incoming telephone number dialed by the caller and the recipient that the caller selected for the particular assigned incoming telephone number.

In Block 660, the funds available to the caller are checked. In one embodiment, the available funds to the caller are equal to the amount of prepaid funds that have not been utilized. In another embodiment, the available funds to the caller are equal to the amount of remaining credit available to the caller. In one embodiment, the available funds are stored at the funds field 440.

If there are funds available to the caller, the caller is connected with the recipient in Block 670. In one embodiment, the recipient is determined in the Block 650.

In Block 680, the available funds are updated based on the amount subtracted in response to the telephone call connecting the caller and the recipient in the Block 670.

In use, a caller customizes the caller's profile by selecting particular recipients to be associated with corresponding assigned incoming telephone numbers in one embodiment. In this embodiment, the caller also customizes the caller's profile by selecting telephone numbers to be associated with the caller.

In one embodiment, the caller dials one of the assigned incoming telephone numbers from one of the caller's telephone numbers associated with the caller. Based on the dialed assigned incoming telephone number and the telephone call initiated from one of the caller's telephone numbers, the caller is connected with the recipient without further action from the caller. In one embodiment, the recipient is determined based on the caller's profile that associates a recipient with the dialed assigned incoming telephone number.

In one embodiment, multiple recipients are associated with the same assigned incoming telephone number. The specific recipient that receives a telephone call directed to the same assigned incoming telephone number depends on the identity of the caller. In one embodiment, the identity of the caller is determined by the caller's telephone number when initiating the telephone call.

In one embodiment, the assigned incoming telephone numbers are in the same local calling area of the caller. For example, the caller does not incur long distance or toll charges when dialing one of the assigned incoming telephone numbers. In another embodiment, the assigned incoming telephone numbers are toll free numbers that do not charge the caller with a toll charge and are often called "800" numbers.

In one embodiment, the recipients associated with the assigned incoming telephone numbers are located outside the local calling area of the caller.

In one embodiment, the caller is charged for the call based on the length of the call. In another embodiment, the caller is charged for the call based on the location of the recipient of the call.

The foregoing descriptions of specific embodiments of the invention have been presented for purposes of illustration and description. The invention may be applied to a variety of other applications. They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A computer implemented telephone routing method for reaching a recipient at a telephone number different than a dialed telephone number, comprising:
   associating respective pluralities of personal calling numbers, corresponding to respective users, to a plurality of assigned telephone numbers, each said assigned telephone number being associated with multiple personal calling numbers of multiple users;
   storing user profiles of multiple users comprising the assigned telephone numbers, user identity, and associated personal calling numbers, wherein one or more of the associated personal calling numbers are outside of the local area of its assigned telephone number;
   receiving a dialed telephone number comprising one of the assigned telephone numbers;
   receiving identifier information associated with the dialed telephone call;
   searching information contained in the user profiles and determining the associated personal calling number for the dialed telephone number based on a comparison of the identifier information and user identity in the user profiles when the dialed telephone number is received; and
   dialing the associated personal calling number to reach the recipient for a respective user that dialed the telephone number.

2. The method according to claim 1, wherein the identity information is determined by a caller identification service.

3. The method according to claim 1, further comprising: checking for availability of funds prior to the dialing.

4. The method according to claim 3, wherein the availability of funds is based on an amount of money pre-purchased by a caller.

5. The method according to claim 3, wherein the availability of funds is based on an amount of credit extended to a caller.

6. The method according to claim 1, further comprising: charging for a call connecting a caller and recipient based on a length of a call.

7. The method according to claim 1, further comprising: charging for a call connecting a caller and recipient based on a location of the recipient.

8. The method according to claim 1, wherein a user is served by a local PSTN and a recipient is served by a remote PSTN.

9. The method according to claim 8, wherein an alternative call pathway connecting the local PSTN and the remote PSTN is at least partially within the Internet.

10. The method according to claim 8, wherein an alternative call pathway connecting the local PSTN and the remote PSTN is at least partially within a private network.

* * * * *